United States Patent
Wu et al.

(10) Patent No.: US 12,482,403 B2
(45) Date of Patent: Nov. 25, 2025

(54) POWER-SUPPLY ADJUSTING CIRCUIT AND DISPLAY TERMINAL

(71) Applicant: HKC Corporation Limited, Guangdong (CN)

(72) Inventors: Han Wu, Guangdong (CN); Haijiang Yuan, Guangdong (CN)

(73) Assignee: HKC CORPORATION LIMITED, Guangdong (CN)

( * ) Notice: Subject to any disclaimer, the term of this patent is extended or adjusted under 35 U.S.C. 154(b) by 0 days.

(21) Appl. No.: 18/634,330

(22) Filed: Apr. 12, 2024

(65) Prior Publication Data

US 2024/0355264 A1   Oct. 24, 2024

(30) Foreign Application Priority Data

Apr. 20, 2023   (CN) .......................... 202310460183.4

(51) Int. Cl.
  *G09G 3/20*       (2006.01)
  *G06F 1/26*       (2006.01)
  *G06F 1/30*       (2006.01)
  *G09G 3/3283*     (2016.01)
  *G09G 3/3291*     (2016.01)
  *G09G 3/36*       (2006.01)

(52) U.S. Cl.
  CPC .............. *G09G 3/2096* (2013.01); *G06F 1/26* (2013.01); *G06F 1/30* (2013.01); *G09G 3/3283* (2013.01); *G09G 3/3291* (2013.01); *G09G 3/3696* (2013.01); *G09G 2320/0223* (2013.01); *G09G 2330/021* (2013.01); *G09G 2330/028* (2013.01); *G09G 2330/04* (2013.01)

(58) Field of Classification Search
  CPC ......... G09G 2330/00; G09G 2330/028; G09G 2330/021; G09G 3/2096; G09G 2330/04; G09G 2330/02; G09G 2320/0223; G09G 3/3283; G09G 3/3696; G09G 2310/0275; G09G 3/3291; G09G 2300/0823; G09G 2300/0819; G09G 2320/0247; H02H 3/18; H02H 3/003; H02H 9/02; G06F 1/266; G06F 11/004; G06F 1/26
  See application file for complete search history.

(56) References Cited

U.S. PATENT DOCUMENTS

10,320,180 B1 *   6/2019   Venigalla ........... H01R 13/6683
11,303,119 B2 *   4/2022   Fu ............................. H02H 3/18
(Continued)

*Primary Examiner* — Dismery Mercedes
(74) *Attorney, Agent, or Firm* — Scully, Scott, Murphy & Presser, P.C.

(57) ABSTRACT

Disclosed are a power-supply adjusting circuit and a display terminal. The power-supply adjusting circuit is applied to a display panel for image display. The power-supply adjusting circuit is connected to a driving power output terminal of a power-supply circuit, the power-supply circuit is configured to output driving power to multiple data driving circuits of the display panel via the driving power output terminal. The power-supply adjusting circuit is configured to receive reverse current and absorb-and-store the reverse current or the power-supply adjusting circuit is configured to receive the reverse current and discharge the reverse current to a ground terminal, when the power-supply adjusting circuit detects that the reverse current is input via the driving power output terminal.

18 Claims, 7 Drawing Sheets

(56) References Cited

U.S. PATENT DOCUMENTS

| | | | |
|---|---|---|---|
| 11,915,654 B1* | 2/2024 | Zhou | G09G 3/3291 |
| 2011/0115770 A1* | 5/2011 | Seo | H05B 45/3725 |
| | | | 323/283 |
| 2012/0038614 A1* | 2/2012 | Mizumaki | G09G 3/3614 |
| | | | 345/211 |
| 2015/0116302 A1* | 4/2015 | Kim | G09G 3/3208 |
| | | | 345/212 |
| 2015/0235595 A1* | 8/2015 | Sugihara | G09G 3/3233 |
| | | | 345/691 |
| 2017/0040883 A1* | 2/2017 | Hu | H02M 3/156 |
| 2017/0199537 A1* | 7/2017 | Duong | G05F 1/575 |
| 2018/0231590 A1* | 8/2018 | Choi | G05F 1/461 |
| 2019/0190252 A1* | 6/2019 | Hanagami | G05F 1/575 |
| 2020/0035189 A1* | 1/2020 | Zhang | H03K 17/6871 |
| 2023/0081260 A1* | 3/2023 | Lee | G09G 3/3291 |
| | | | 345/94 |

* cited by examiner

POWER-SUPPLY ADJUSTING CIRCUIT AND DISPLAY TERMINAL

CROSS-REFERENCE TO RELATED APPLICATION

This application claims priority under 35 U.S.C. § 119(a) to Chinese Patent Application No. 2023104601834, filed Apr. 20, 2023, the entire disclosure of which is incorporated herein by reference.

TECHNICAL FIELD

This disclosure relates to the field of display technology, and in particular, to a power-supply adjusting circuit and a display terminal.

BACKGROUND

In a liquid crystal display, a data driving circuit (e.g., a source driver integrated circuit (IC)) provides a data voltage for image display to a display panel, and an operating voltage of the data driving circuit is provided by the power-supply module. Because the data driving circuit is in a continuous charging-and-discharging process, the power-supply module not only needs to supply current to the data driving circuit, but also needs to receive current (sink) reversed by the data driving circuit.

However, large current reversed to the power-supply module will cause damage to the power-supply module, and therefore, how to improve a protection capability of the power-supply module against reverse current is an urgent problem to be solved.

SUMMARY

A power-supply adjusting circuit is provided in the present disclosure, the power-supply adjusting circuit is applicable to a display panel for image display. The power-supply adjusting circuit is connected to a driving power output terminal of a power-supply circuit, the power-supply circuit is configured to output driving power to multiple data driving circuits of the display panel via the driving power output terminal. The power-supply adjusting circuit is configured to receive reverse current and absorb-and-store the reverse current or the power-supply adjusting circuit is configured to receive the reverse current and discharge the reverse current to a ground terminal, when the power-supply adjusting circuit detects that the reverse current is input via the driving power output terminal.

A display terminal is further provided in the present disclosure. The display terminal includes a display panel, a power-supply circuit, and the power-supply adjusting circuit described above. The power-supply circuit and the power-supply adjusting circuit are configured to provide driving power for image display of the display panel. The display panel includes a control board and a driver board. The control board is configured to temporarily store and decode an image data to be displayed into a driving signal, the driver board is connected to the control board and multiple data driving circuits, and the driver board is configured to receive the driving signal from the control board and transmit the driving signal to the multiple data driving circuits and drive, by the multiple data driving circuits, pixel units in a display region to display an image. The power-supply circuit and the power-supply adjusting circuit are disposed in the control board; or the power-supply circuit is disposed in the control board, and the power-supply adjusting circuit is disposed in the driver board.

BRIEF DESCRIPTION OF THE DRAWINGS

In order to describe technical solutions in implementations of the disclosure more clearly, the following will give a brief introduction to the accompanying drawings required for describing implementations. Apparently, the accompanying drawings hereinafter described are merely some implementations of the disclosure. Based on these drawings, those of ordinary skill in the art can also obtain other drawings without creative effort.

DETAILED DESCRIPTION

In order to facilitate understanding of the present disclosure, a detailed description will now be given with reference to relevant accompanying drawings. The accompanying drawings illustrate some examples of implementations of the present disclosure. However, the present disclosure can be implemented in many different forms and is not limited to the implementations described herein. On the contrary, these implementations are provided for a more thorough and comprehensive understanding of the present disclosure.

Description of various implementations are referred to the accompanying drawings, which are used to exemplify specific implementations that can be implemented in this disclosure. Numbers of components in this disclosure, such as "first", "second", etc., are only used to distinguish the objects described and do not have any sequential or technical meaning. Terms "connection" and "link" mentioned in this disclosure, unless specifically stated otherwise, include both direct and indirect connections (links). It should be understood that directional terms mentioned in the disclosure such as "on", "under", "front", "back", "left", "right", "in", "out", "side", and the like is a direction based on accompanying drawings and are only for the convenience of description and simplicity, rather than explicitly or implicitly indicate that apparatuses or components referred to herein must have a certain direction or be configured or operated in a certain direction and therefore cannot be understood as limitation on the disclosure.

Unless stated otherwise, in the disclosure, terms "installing", "coupling", "connecting", and the like referred to herein should be understood in broader sense. For example, connecting may be a fixed connecting, a removable connecting, or an integrated connecting, may be a mechanical connecting, and may be a direct connecting, an indirect connecting through a medium, or a communication connecting between two components. For those of ordinary skill in the art, the above terms in the present disclosure can be understood according to specific situations. Terms "first", "second", and the like used in the specification, the claims, and the accompany drawings of the disclosure are used to distinguish different objects rather than describe a particular order.

Additionally, the terms "including", "may include", "include", or "may include" referred to herein indicate the existence of corresponding functions, operations, elements, etc. that are disclosed, and do not limit one or more other functions, operations, elements, etc. In addition, the terms "comprises" or "comprising" means that there are corresponding features, numbers, steps, operations, elements, components, or a combination thereof disclosed in the specification, and do not exclude the presence or addition of one or more other features, numbers, steps, operations, elements, components, or a combination thereof, and are intended to cover a non-exclusive inclusion. In addition, when describing implementations of the present disclosure, "can" or "may" is used to mean "one or more implementations of the present disclosure". Also, the term "exemplary" is intended to mean an implementation or an example.

Unless otherwise defined, all technical and scientific terms used herein have the same meaning as commonly understood by those skilled in the art of the present disclosure. The terms used herein in the disclosure are for the purpose of describing implementations only and are not intended to limit the disclosure.

In view of deficiencies of the related art, the present disclosure provides a power-supply adjusting circuit and a display terminal, which are intended to solve the problem of damage of reverse current to a power-supply module, to enhance resistance of the power-supply module against the reverse current, and to prevent damage of the reverse current to the power-supply module.

A power-supply adjusting circuit is provided in the present disclosure, the power-supply adjusting circuit is applicable to a display panel for image display. The power-supply adjusting circuit is connected to a driving power output terminal of a power-supply circuit, the power-supply circuit is configured to output driving power to multiple data driving circuits of the display panel via the driving power output terminal. The power-supply adjusting circuit is configured to receive reverse current and absorb-and-store the reverse current or the power-supply adjusting circuit is configured to receive the reverse current and discharge the reverse current to a ground terminal, when the power-supply adjusting circuit detects that the reverse current is input via the driving power output terminal.

In an implementation, when the power-supply adjusting circuit detects that current output via the driving power output terminal serves as the driving power, the power-supply adjusting circuit is configured to output a compensation current for compensating the driving power output by the power-supply circuit to the multiple data driving circuits.

In an implementation, the power-supply adjusting circuit includes a detecting circuit, a first adjusting circuit, and an energy storage circuit. The detecting circuit is connected to the driving power output terminal and is configured to detect the reverse current input via the driving power output terminal, and the first adjusting circuit is connected to the detecting circuit and the energy storage circuit. When the detecting circuit detects the reverse current, the detecting circuit is configured to output a first control signal to the first adjusting circuit, and the first adjusting circuit is configured to receive the reverse current according to the first control signal and transmit the reverse current to the energy storage circuit for storage or discharge.

In an implementation, the power-supply adjusting circuit further includes a second adjusting circuit. The second adjusting circuit is connected to the energy storage circuit, and when the detecting circuit detects current is output via the driving power output terminal, the detecting circuit is configured to output a second control signal to the second adjusting circuit, and the second adjusting circuit is configured to control, according to the second control signal, the energy storage circuit to output the compensation current to compensate the driving power output by the power-supply circuit.

In an implementation, the driving power output terminal is electrically connected to the multiple data driving circuits via a power transmission line, the detecting circuit includes a first resistor, a first node, and a second node, the first node and the second node are two nodes at different positions in the power transmission line, the first resistor is connected in the power transmission line via the first node and a second node, the first node is disposed at one end of the first resistor away from the power-supply circuit, and the second node is located at one end of the first resistor close to the power-supply circuit. The detecting circuit further includes a comparator, the comparator has comparison input ends connected to the first node and the second node respectively, the comparator is configured to detect and compare a voltage at the first node and a voltage at the second node. The comparator is configured to output the first control signal from a first comparison output terminal to the first adjusting circuit in response to detecting that the voltage at the first node is greater than the voltage at the second node, and the comparator is configured to output the second control signal from a second comparison output terminal to the second adjusting circuit in response to detecting that the voltage at the second node is greater than the voltage at the first node.

In an implementation, the first adjusting circuit includes a first switching transistor and a second switching transistor. The first switching transistor has a control terminal connected to the first comparison output terminal of the comparator, and is configured to receive the first control signal from the comparator and to be turned on under control of the first control signal, and the first switching transistor has a first conductive terminal connected to the power transmission line and a second conductive terminal connected to the energy storage circuit. The second switching transistor has a control terminal connected to the first comparison output terminal of the comparator, and is configured to receive the first control signal from the comparator and to be turned on under control of the first control signal. The second switching transistor has a first conductive terminal connected to the energy storage circuit and a second conductive terminal connected to the ground terminal. The energy storage circuit is configured to receive and store electric charges in the signal transmission line when the first switching transistor and the second switching transistor are turned on.

In an implementation, the second adjusting circuit includes a third switching transistor and a fourth switching transistor. The third switching transistor has a control terminal connected to the second comparison output terminal of the comparator, and is configured to receive the second control signal from the comparator and to be turned on under control of the second control signal, the third switching transistor has a first conductive terminal connected to the energy storage circuit and a second conductive terminal connected to the power transmission line. The fourth switching transistor has a control terminal connected to the second comparison output terminal of the comparator, and is configured to receive the second control signal from the comparator and to be turned on under control of the second control signal, the fourth switching transistor has a first conductive terminal connected to a power supply voltage terminal and a second conductive terminal connected to the energy storage circuit, and the energy storage circuit is configured to output the compensation current to the power transmission line when the third switching transistor and the fourth switching transistor are tuned on.

In an implementation, the energy storage circuit includes a first capacitor, a second capacitor, a third node, and a fourth node, the first capacitor and the second capacitor are connected in parallel between the third node and the fourth node, the second conductive terminal of the first switching transistor and the first conductive terminal of the third switching transistor are connected to the third node, and the first conductive terminal of the second switching transistor and the second conductive terminal of the fourth switching transistor are connected to the fourth node.

In an implementation, the power-supply adjusting circuit further includes a voltage regulator circuit, the voltage regulator circuit includes a second resistor and a third resistor, the second resistor is connected between the ground terminal and control terminals of the first switching transistor and the second switching transistor, and the second resistor is configured to maintain the first switching transistor and the second switching transistor in an off state when the comparator does not output the first control signal. The third resistor is connected between the power supply voltage terminal and control terminals of the third switching transistor and the fourth switching transistor, and is configured to maintain the third switching transistor and the fourth switching transistor in an off state when the comparator does not output the second control signal.

A display terminal is further provided in the present disclosure. The display terminal includes a display panel, a power-supply circuit, and the power-supply adjusting circuit described above. the power-supply circuit and the power-supply adjusting circuit are configured to provide driving power for image display of the display panel. The display panel includes a control board and a driver board. The control board is configured to temporarily store and decode an image data to be displayed into a driving signal, the driver board is connected to the control board and multiple data driving circuits, and the driver board is configured to receive the driving signal from the control board and transmit the driving signal to the multiple data driving circuits and drive, by the multiple data driving circuits, pixel units in a display region to display an image. The power-supply circuit and the power-supply adjusting circuit are disposed in the control board; or the power-supply circuit is disposed in the control board, and the power-supply adjusting circuit is disposed in the driver board.

Compared with the related art, the power-supply adjusting circuit is arranged to detect current of the driving power output terminal of the power-supply circuit, and when the reverse current is detect at the driving power output terminal, the power-supply adjusting circuit receives the reverse current, and stores the reverse current or discharges the reverse current to the ground terminal, so as to effectively prevent the damage to the power-supply circuit caused by the reverse current and improve the security of the power-supply circuit.

Figure 1:
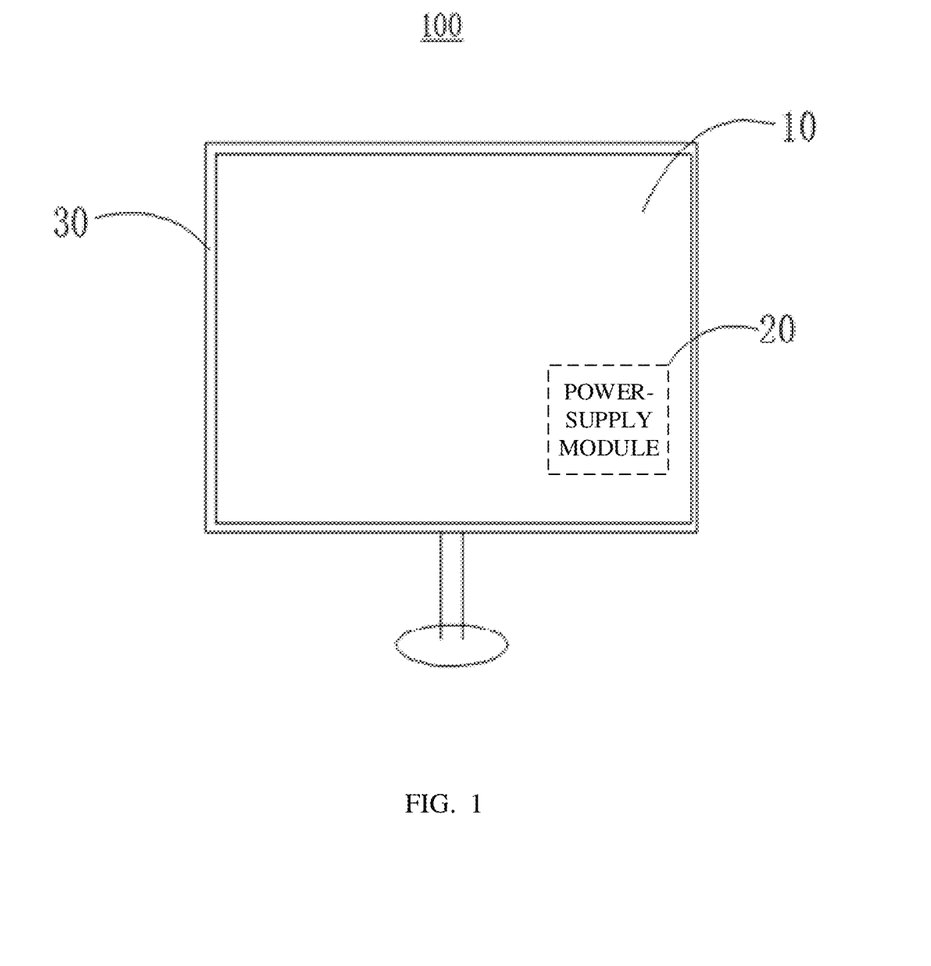
FIG. 1 is a schematic structural diagram of a display terminal according to a first implementation of the present disclosure.

Please refer to FIG. 1, FIG. 1 is a schematic structural diagram of a display terminal according to a first implementation of the present disclosure. As illustrated in FIG. 1, a display terminal 100 includes a display panel 10, a power-supply module 20, and a support frame 30. The display panel 10 and the power-supply module 20 are fixed on the support frame 30. The power-supply module 20 is disposed on a rear surface of the display panel 10, i. e. a non-display surface of the display panel 10. The power-supply module 20 is configured to provide a power voltage for image display of the display panel 10, and the support frame 30 is configured to provide fixing and protection functions for the display panel 10 and the power-supply module 20. In other implementations of the present disclosure, the display terminal 100 may not need to be provided with the support frame 30, for example, a portable electronic device, such as a mobile phone, a tablet computer, etc.

Figure 2:
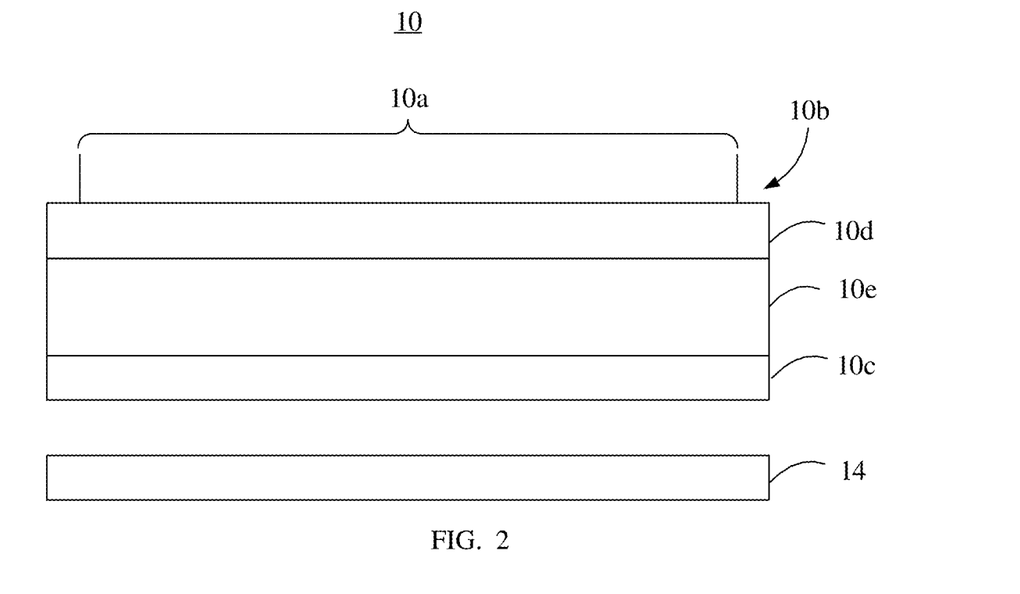
FIG. 2 is a schematic side structural diagram of a display panel in FIG. 1.

Please refer to FIG. 2, which is a schematic side structural diagram of a display panel in FIG. 1.

As illustrated in FIG. 2, the display panel 10 has a display region 10a for image display and a non-display region 10b. The display region is used for image display, and the non-display region 10b is around the display region 10a for arrangement of other auxiliary components or modules. Specifically, the display panel 10 includes an array substrate 10c, a counter substrate 10d, and a display media layer 10e sandwiched between the array substrate 10c and the counter substrate 10d. The array substrate 10c and the counter substrate 10d are each provided with a driving element to generate a corresponding electric field according to a data signal (Data), to drive the display media layer 10e to emit light with corresponding brightness, so as to display images. In this implementation, display medium in the display media layer 10e can be liquid crystal molecules, micro light-emitting diodes (LEDs), mini LEDs, LEDs or other materials.

Taking a liquid crystal display panel as an example, the display media layer 10e has liquid crystal molecules, and the liquid crystal molecules transmit light of a preset brightness through deflection, so as to display images. The display panel 10 further includes a backlight module (BM) 14, and the backlight module 14 is configured to provide light for display to the display region 10a of the display panel 10, and the display panel 10 emits corresponding light according to a signal of an image to be displayed so as to perform image display. The display panel 10 further includes other elements or components, such as a signal processing module and a signal sensing module.

Figure 3:
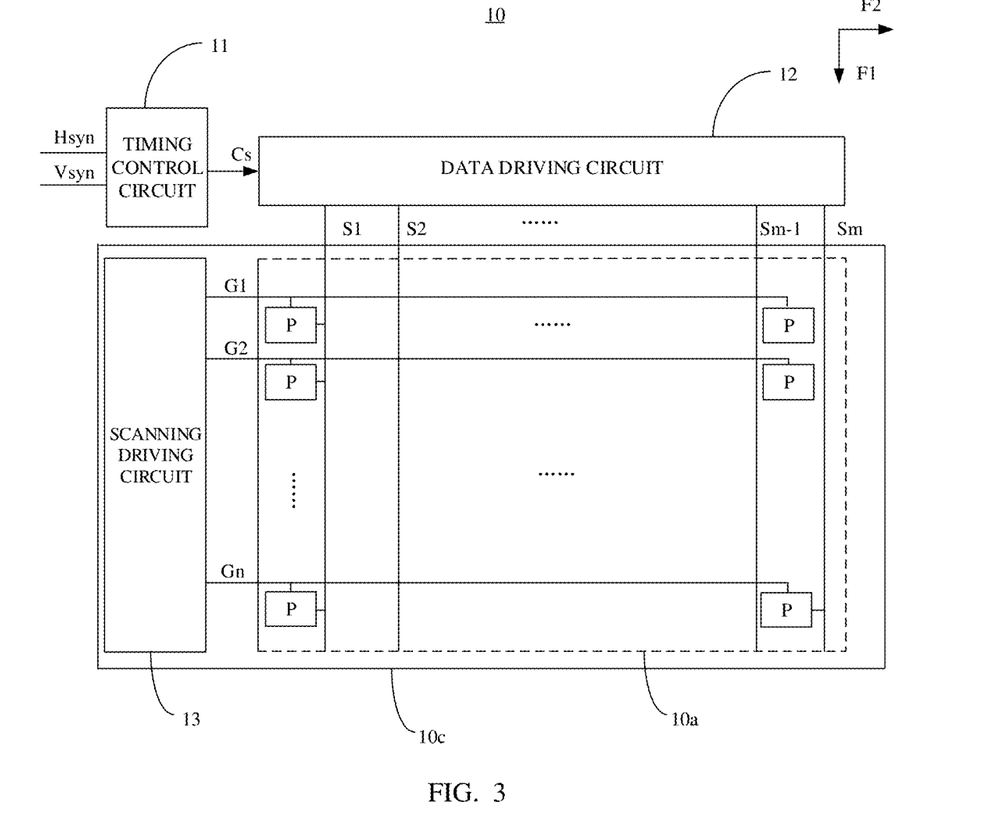
FIG. 3 is a schematic plan layout diagram of an array substrate in FIG. 2.

Please also refer to FIG. 3, which is a schematic plan layout diagram of the array substrate in FIG. 2.

As illustrated in FIG. 3, the display panel 10 further includes a data driving circuit 12, a scanning driving circuit 13, and a timing control circuit 11. The timing control circuit 11, the data driving circuit 12, and the scanning driving circuit 13 are disposed in the non-display region 10b.

M data lines (i.e., source lines) S1~Sm and n gate lines G1~Gn are arranged in a grid in the display region 10a of the display panel 10. M data lines S1~Sm each extend in a first direction F1, and n scanning lines G1~Gn each extend in a second direction F2. The first direction F1 is perpendicular to the second direction F2, and pixel units P are disposed at intersections of n scanning lines G1~Gn and data lines S1~Sm.

The timing control circuit 11 is configured to receive an image signal representing image information, a horizontal synchronization signal Hsync, and a vertical synchronization signal Vsync from an external signal source, and is configured to output a clock signal and a scanning control signal Cg for controlling the scanning driving circuit 13, and a data control signal Cs for controlling the data driving circuit 12.

M data lines S1~Sm are connected to the data driving circuit 11 and are configured to receive, from the data driving circuit 12, a data signal stored and transmitted in a grayscale value. N scanning lines G1~Gn are connected to the scanning driving circuit 13 and are configured to receive a scanning signal from the scanning driving circuit 13.

The pixel units P each are configured to receive a data voltage corresponding to a grayscale value in a data signal in data lines S1~Sm under the control of n scanning lines G1~Gn in a predetermined period of time, and accordingly drive the display media layer 10e to deflect by a corresponding angle, so that a received backlight is emitted as light of a corresponding brightness according to a corresponding deflected angle, thereby displaying an image by emitting light of a corresponding brightness according to an image signal.

The scanning driving circuit 13 is configured to receive the scanning control signal Cg output by the timing control circuit 11 and output scanning signals to each of the scanning lines G1~Gn. The data driving circuit 12 is configured to receive the data control signal Cs output by the timing control circuit 11, and output to each of the data lines S1~Sm data signals for driving elements in respective pixel units P in the display region 10a to display images. The data signal provided to the display panel 10 is an analog grayscale voltage. The scanning driving circuit 13 is configured to output a scanning signal to control the pixel units P to receive the data signal output by the data driving circuit 12, so as to control the pixel units P to display a corresponding image.

In this implementation, circuit elements in the scanning driving circuit 13 and the pixel units P in the array substrate 10c are manufactured in the array substrate 10c in the same process, i. e., a gate driver on array (GOA) technology.

Figure 4:
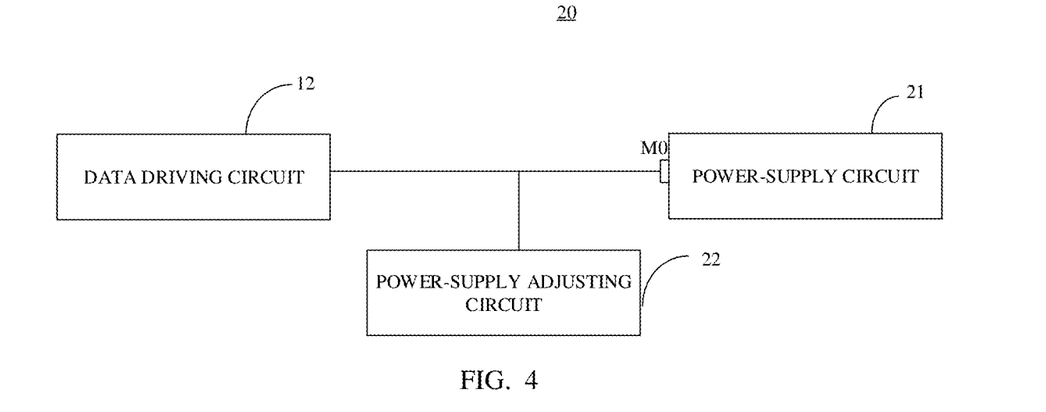
FIG. 4 is a block diagram of a power-supply module in FIG. 1.

Please refer to FIG. 4, which is a block diagram of a power-supply module in FIG. 1.

As illustrated in FIG. 4, the power-supply module 20 includes a power-supply circuit 21 and a power-supply adjusting circuit 22. The power-supply circuit 21 is configured to output driving power to the data driving circuit 12 in the display panel 10 via a driving power output terminal M0, the data driving circuit 12 is configured to receive the driving power from the power-supply circuit 21, adjust a data voltage corresponding to the data signal according to a data control signal Cs output by the timing control circuit 11, and transmit the data voltage to the pixel units P, to drive the pixel units P to emit light in a preset gray scale for image display.

Of course, the power-supply circuit 21 may also provide driving power for the timing control circuit 11 and the scanning driving circuit 13, and the timing control circuit 11, the data driving circuit 12, and the scanning driving circuit 13 control the pixel units P in the display panel 10 to display images according to the driving power.

When the power-supply adjusting circuit 22 detects that a reverse current is input through the driving power output terminal M0, the power-supply adjusting circuit 22 is configured to receive the reverse current, and absorb and store the reverse current or discharge the reverse current to a ground terminal. The reverse current is a current flowing to the power-supply circuit 21. When the power-supply adjusting circuit 22 detects current is output through the driving power output end M0 as the driving power, the power-supply adjusting circuit is configured to output a compensation current for compensating the driving power output by the power-supply circuit 21 to the data driving circuit 12.

That is, the power-supply adjusting circuit 22 is configured to detect the reverse current at the driving power output end 240 when the power-supply circuit 21 stops outputting the driving power, and store or discharge the reverse current to prevent the reverse current from entering the power-supply circuit 21 to damage the power-supply circuit 21. The power-supply adjusting circuit 22 is further configured to output the compensation current for compensating the driving power in response to detecting that the power-supply circuit 21 outputs the driving power, to reduce a load of the power-supply circuit 21 when outputting the driving power, and enable the power-supply circuit 21 to output a stable voltage.

Figure 5:
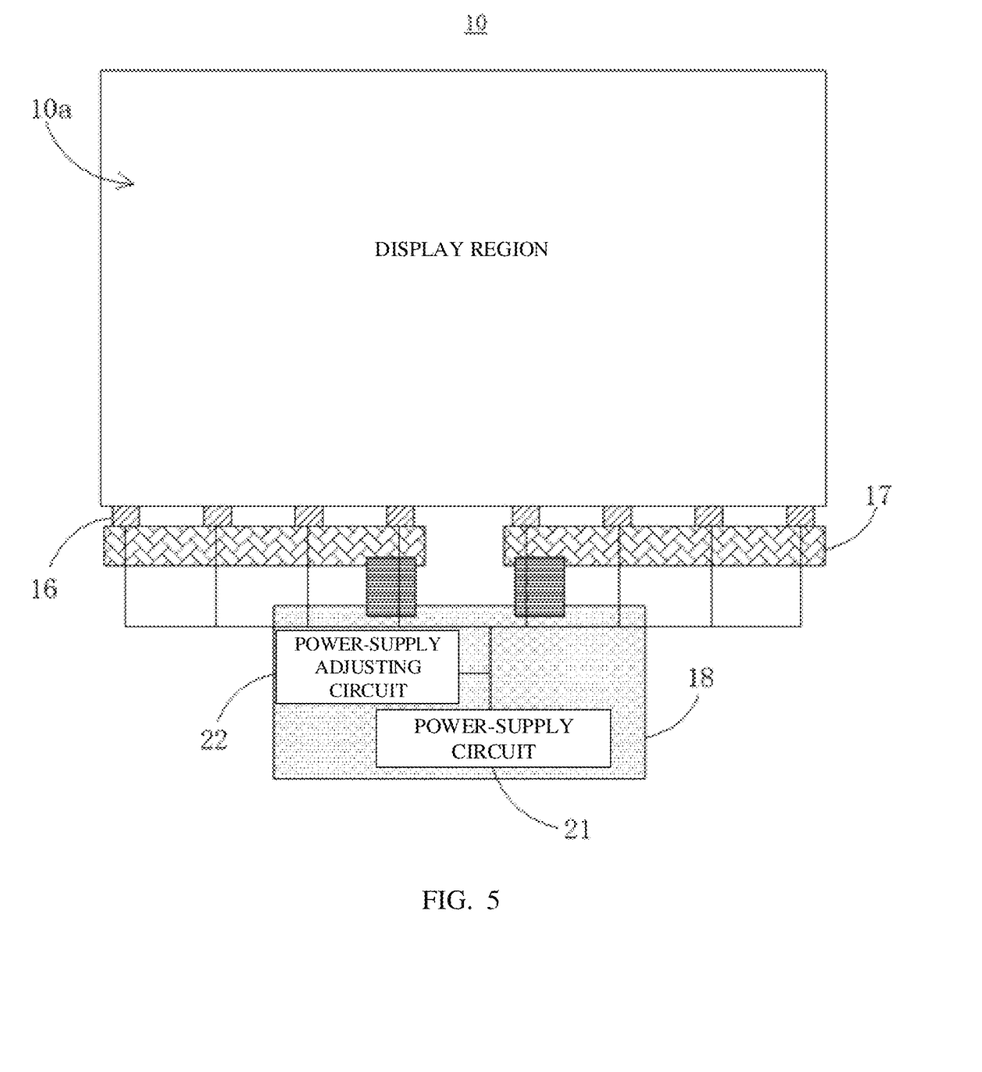
FIG. 5 is a schematic layout diagram of a power-supply adjusting circuit in FIG. 4.

Please refer to FIG. 5, which is schematic layout diagram of a power-supply adjusting circuit in FIG. 4.

As illustrated in FIG. 5, the display panel 10 further includes multiple chip on films (COFs) 16, a driver board 17, and a control board 18. The multiple chip on films 16 are disposed in the non-display region 10b and are configured to fix a driving chip, i. e. a data driving circuit 12, in the non-display region 10b adjacent to the display region 10a. The control board 18 is configured to temporarily store and decode image data to be displayed into a driving signal. The driver board 17 is connected to the control board 18 and the multiple COFs 16, and is configured to receive the driving signal from the control board 18 and transmit the driving signal to the COFs 16. The pixel units P in the display region 10a are driven by the COFs 16 to display images.

The power-supply circuit 21 and the power-supply adjusting circuit 22 are disposed in the control board 18. The power-supply circuit 21 is configured to provide driving power for each functional module. The power-supply adjusting circuit 22 is configured to adjust and compensate the driving power output by the power-supply circuit 21. When the power-supply circuit 21 stops outputting, the power-supply adjusting circuit 22 is configured to receive the reverse current transmitted to the power-supply circuit 21, thereby preventing the reverse current from damaging the power-supply circuit 21.

Figure 6:
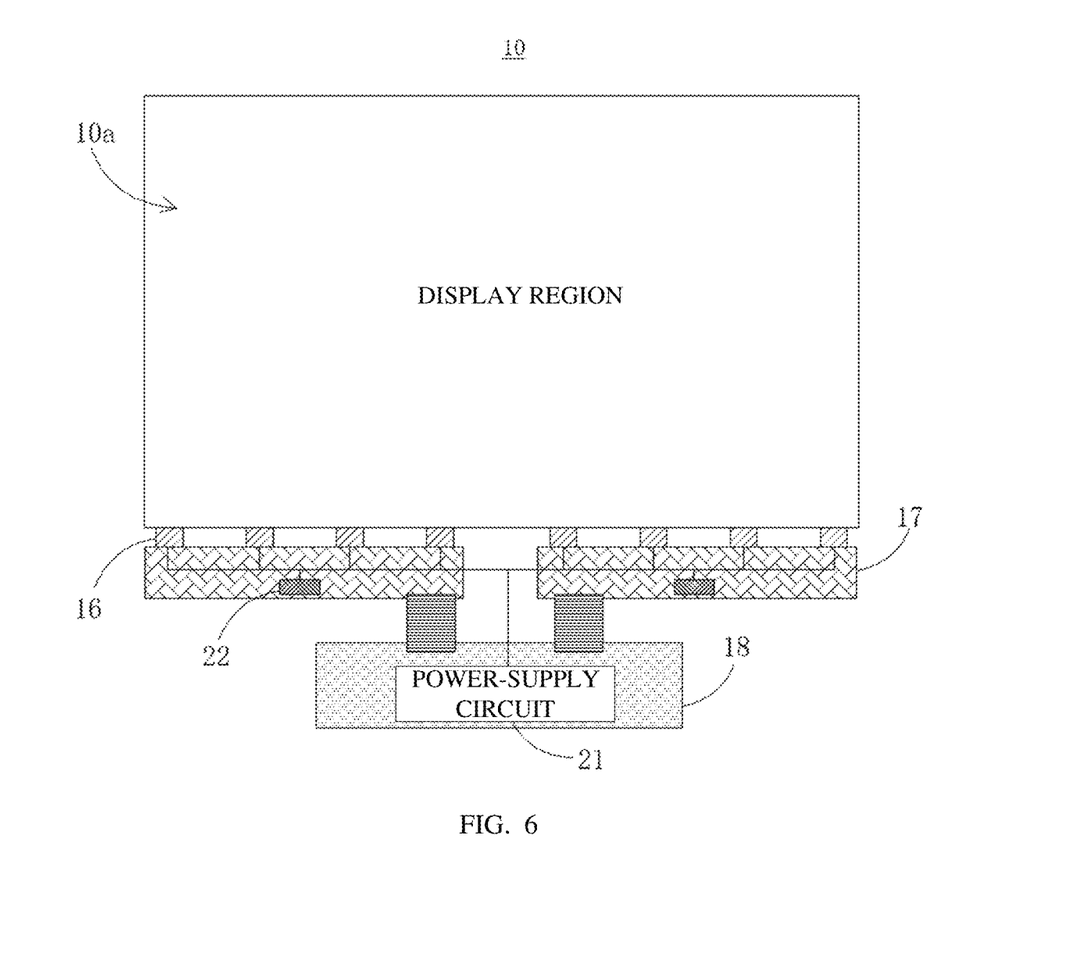
FIG. 6 is a schematic layout diagram of the power-supply adjusting circuit in FIG. 4 according to another implementation.

Please refer to FIG. 6, which a schematic layout diagram of the power-supply adjusting circuit in FIG. 4 according to another implementation. The difference between the power-supply adjusting circuit in FIG. 6 and the power-supply adjusting circuit in FIG. 5 lies in that at least two power-supply adjusting circuits 22 are disposed on at least two driver boards 17, respectively.

As illustrated in FIG. 6, the display panel 10 further includes multiple COFs 16, a driver board 17, and a control board 18. The multiple COFs 16 are disposed in the non-display region 10b and are configured to fix a driving chip, i. e. a data driving circuit 12, in the non-display region 10b adjacent to the display region 10a. The control board 18 is configured to temporarily store and decode image data to be displayed into a driving signal. The driver board 17 is connected to the control board 18 and the multiple COFs 16, and is configured to receive the driving signal from the control board 18 and transmit the driving signal to the COFs 16. The pixel units P in the display region 10a are driven by the COFs 16 to display images.

The power-supply circuit 21 is disposed on the control board 18, at least two power-supply adjusting circuits 22 are disposed on at least two driver boards 17, respectively, the power-supply circuit 21 is configured to provide driving power for various functional modules, and the power-supply adjusting circuit 22 is configured to adjust and compensate the driving power output by the power-supply circuit 21. When the power-supply circuit 21 stops outputting, the power-supply adjusting circuit 22 is configured to receive the reverse current transmitted to the power-supply circuit 21 to prevent the reverse current from damaging the power-supply circuit 21. By arranging the power-supply adjusting circuit 22 on each driver board 17, the magnitude of the reverse current processed by each power-supply adjusting circuit 22 can be reduced, thereby reducing the load of the power-supply adjusting circuit 22.

Figure 7:
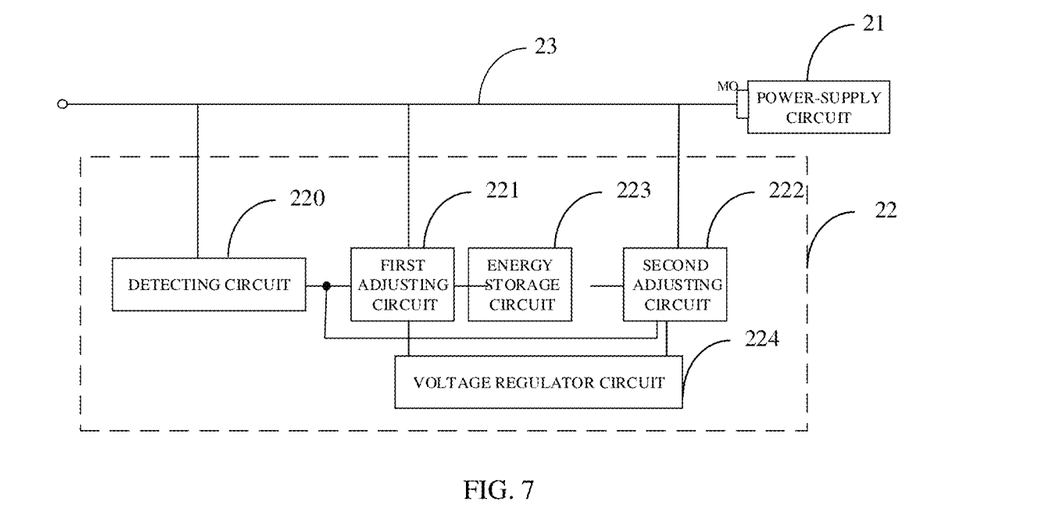
FIG. 7 is a block diagram of the power-supply adjusting circuit in FIG. 4.

Please refer to FIG. 7, which is a block diagram of the power-supply adjusting circuit in FIG. 4.

As illustrated in FIG. 7, the power-supply adjusting circuit 22 includes a detecting circuit 220, a first adjusting circuit 221, and an energy storage circuit 223. The power-supply module 20 further includes a power transmission line 23, and the power-supply circuit 21 is configured to output a driving power to the data driving circuit 12 via the power transmission line 23. The detecting circuit 220 is connected to the power transmission line 23 and is configured to detect the driving power output by the power-supply circuit 21 or receive the reverse current reversed by the data driving circuit 12. That is, the detecting circuit 220 is configured to detect the magnitude of the current of the driving power output by the power-supply circuit 21 or the magnitude of the reverse current input to the power-supply circuit 21. In other words, the detecting circuit 220 is capable of simultaneously detecting the direction and the magnitude of the current in the power transmission line 23 connected to the power-supply circuit 21.

The first adjusting circuit 221 is connected to the detecting circuit 220 and the energy storage circuit 223, and is configured to adjust the current in the power transmission line 23 according to a detection result of the detecting circuit 220. When the detecting circuit 220 detects that a reverse current is transmitted through the power transmission line 23, the first adjusting circuit 221 is configured to receive the reverse current transmitted through the power transmission line 23, and transmit the reverse current to the energy storage circuit 223 for storage, or transmit the reverse current to the ground terminal GND through the energy storage circuit 223 for discharge, thus ensuring the security of the power-supply circuit 21.

The power-supply adjusting circuit 22 further includes a second adjusting circuit 222, and the second adjusting circuit 222 is connected to the energy storage circuit 223. When the detecting circuit 220 detects that the current of the driving power output by the power-supply circuit 21 is transmitted through the power transmission line 23, that is, when the power-supply circuit 21 outputs the driving power to the data driving circuit 12, the second adjusting circuit 222 is configured to control the energy storage circuit 223 to output the compensation current to the power transmission line 23 to compensate the driving power output by the power-supply circuit 21, and reduce an output pressure of the power-supply circuit 21.

The power-supply adjusting circuit 22 further includes a voltage regulator circuit 224. The voltage regulator circuit 224 is connected to the first adjusting circuit 221 and the second adjusting circuit 222, and is configured to maintain potentials of the first adjusting circuit 221 and the second adjusting circuit 222 when the detecting circuit 220 detects no current in the power transmission line 23, so as to control the first adjusting circuit 221 and the second adjusting circuit 222 to stop operation.

By detecting and identifying the reverse current in the power transmission line 23, and conducting, by the first adjusting circuit 221, the current reversed to the power transmission line 23 to the energy storage circuit 223, the effect of the reverse current on the power-supply circuit 21 is effectively eliminated. Additionally, when the power-supply circuit 21 outputs, the second adjusting circuit 222 controls the energy storage circuit 223 to output the compensation current to the power transmission line 23, thereby effectively compensating the driving power output by the power-supply circuit 21 and reducing the output pressure of the power-supply circuit 21. The received and stored reverse current is output to the power transmission line 23 as the compensation current, and thus the utilization rate of the drive power is further improved to some extent, thereby saving energy or reducing power consumption. Due to the compensation current, a driving capability of the power-supply circuit 21 is improved, so that the driving power output by the power-supply circuit 21 is more stable, thereby further improving a display effect.

Figure 8:
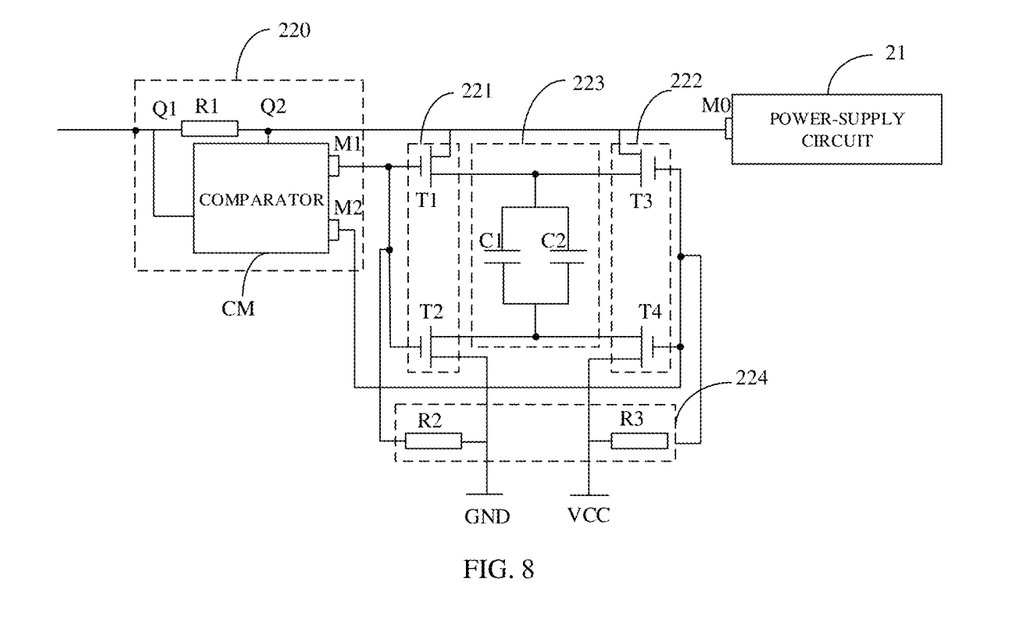
FIG. 8 is a schematic diagram of an equivalent circuit of the power-supply adjusting circuit in FIG. 7.

Please also refer to FIG. 8, which is a schematic diagram of an equivalent circuit of the power-supply adjusting circuit in FIG. 7.

As illustrated in FIG. 8, the detecting circuit 220 includes a first resistor R1, a comparator CM, a first node Q1, and a second node Q2. The first node Q1 and the second node Q2 are two nodes at different positions in the power transmission line 23. The first resistor R1 is connected in series in the power transmission line 23 through the first node Q1 and the second node Q2, that is, the first resistor R1 is disposed in the power transmission line 23. Output current and input current transmitted in the power transmission line both flow through the first resistor R1. The first node Q1 is one end of the first resistor R1 away from the power-supply circuit 21, and the second node Q2 is one end of the first resistor R1 close to the power-supply circuit 21.

Comparison input ends of the comparator CM are connected to the first node Q1 and the second node Q2 respectively, and the comparator CM is configured to detect and compare a voltage of the first node Q1 and a voltage of the second node Q2, that is, a voltage across the first resistor R1, and determine a direction of the current in the power transmission line 23 according to the magnitude of the voltage of the first node Q1 and the magnitude of the voltage of the second node Q2, so as to determine whether the current is output by the power-supply circuit 21 or flowing to the power-supply circuit 21 (reverse current).

When the first voltage V1 is detected to be greater than the second voltage V2, that is, the voltage at the first node Q1 is detected to be greater than the voltage at the second node Q2, it indicates that a current in the power transmission line 23 is a reverse current, and a direction of the current is from the first node Q1 to the second node Q2. The comparator CM outputs a first control signal from the first comparison output terminal M1 to the first adjusting circuit 221, and the first adjusting circuit 221 controls the current in the power transmission line 23 according to the first control signal to be input to the energy storage circuit 223 for storage or to be discharged to the ground terminal GND via the energy storage circuit 223.

When the first voltage V1 is detected to be less than the second voltage V2, it indicates that the current in the power transmission line 23 is a source current, that is, the current output by the power-supply circuit 21, and a direction of the current is from the second node Q2 to the first node Q1. The comparator CM outputs a second control signal from the second comparison output terminal M2 to the second adjusting circuit 222, and the second adjusting circuit 222 controls the energy storage circuit 223 to output a compensation current to the power transmission line 23 according to the second control signal to compensate an output of the power-supply circuit 21, so as to reduce a pressure of outputting the driving power by the power-supply circuit 21.

When the difference between the first voltage V1 and the second voltage V2 is detected to be within a pre-set range, the comparator CM does not output any control signal, that is, when the first voltage V1 is substantially the same as the second voltage V2, the comparator CM does not output any control signal. When the difference between the first voltage V1 and the second voltage V2 is within the pre-set range, the power-supply circuit 21 does not output any driving power and no current is reversed to the power transmission line 23.

The first adjusting circuit 221 includes a first switching transistor T1 and a second switching transistor T2. A control terminal of the first switching transistor T1 is connected to the first comparison output terminal M1 of the comparator CM, and the first switching transistor T1 is configured to receive the first control signal from the first comparison output terminal M1, and to be turned on in response to receiving the first control signal. A first conductive terminal of the first switching transistor T1 is connected to the power transmission line 23 between the second node Q2 and the power-supply circuit 21. A second conductive terminal of the first switching transistor T1 is connected to the energy storage circuit 223. A control terminal of the second switching transistor T2 is connected to the first comparison output terminal M1 of the comparator CM, and the second switching transistor T2 is configured to receive the first control signal from the comparator CM and to be turned on in response to receiving the first control signal. A first conductive terminal of the second switching transistor T2 is connected to the energy storage circuit 223, and a second conductive terminal of the second switching transistor T2 is connected to the ground terminal GND. When the first switching transistor T1 and the second switching transistor T2 are turned on, a voltage difference is formed between the power transmission line 23 and the ground terminal GND to charge the energy storage circuit 223 for receiving and storing the electric charges in the power transmission line 23.

The second adjusting circuit 222 includes a third switching transistor T3 and a fourth switching transistor T4. A control terminal of the third switching transistor T3 is connected to the second comparison output terminal M2 of the comparator CM, and the third switching transistor T3 is configured to receive the second control signal from the second comparison output terminal M2, and to be turned on in response to receiving the second control signal. A first conductive terminal of the third switching transistor T3 is connected to the energy storage circuit 223, and a second conductive terminal of the third switching transistor T3 is connected to the power transmission line 23 between the second node Q2 and the power-supply circuit 21. A control terminal of the fourth switching transistor T4 is connected to the second comparison output terminal M2 of the comparator CM, and the fourth switching transistor T4 is configured to receive the second control signal from the second comparison output end M2 and to be turned on in response to receiving the second control signal. A first conductive terminal of the fourth switching transistor T4 is connected to the power supply voltage terminal VCC, and a second conductive terminal of the fourth switching transistor T4 is connected to the energy storage circuit 223. When the third switching transistor T3 and the fourth switching transistor T4 are turned on, the energy storage circuit 223 is electrically connected to the power transmission line 23 and the power supply voltage terminal VCC, and a voltage difference is formed between the power transmission line 23 and the power supply voltage terminal VCC to drive the energy storage circuit 223 to output electric charges to the power transmission line 23 for compensating the driving power output by the power-supply circuit 21.

A control terminal of each switching transistor in the multiple switching transistors T1~T4 is a gate of the switching transistor, the first conductive terminal of each switching transistor is a source of the switching transistor, and the second conductive terminal of each switching transistor is a drain of the switching transistor. Of course, the first conductive terminal of each switching transistor may also be the drain of the switching transistor, and the second conductive terminal of each switching transistor may also be the source of the switching transistor, which may be set according to specific requirements and not limited in the present disclosure.

In this implementation, the energy storage circuit 223 includes a first capacitor C1, a second capacitor C2, a third node Q3, and a fourth node Q4. The first capacitor C1 and the second capacitor C2 are connected in parallel between the third node Q3 and the fourth node Q4. The second conductive terminal of the first switching transistor T1 and the first conductive terminal of the third switching transistor T3 are connected to the third node Q3, and the first conductive terminal of the second switching transistor T2 and the second conductive terminal of the fourth switching transistor T4 are connected to the fourth node Q4.

When the first switching transistor T1 and the second switching transistor T2 receive the first control signal and are turned on, the first capacitor C1 and the second capacitor C2 connected in parallel between the power transmission line 23 and the ground terminal GND are configured to receive the current in the power transmission line 23 for charging and storage or to discharge to the ground terminal GND.

When the amount of electric charges of the reverse current is insufficient to enable the first capacitor C1 and the second capacitor C2 to be fully charged, the first capacitor C1 and the second capacitor C2 can continuously receive the reverse current for charging and storage. When charging of the first capacitor C1 and the second capacitor C2 is completed, i. e. a pre-set charging voltage is reached, the first capacitor C1 and the second capacitor C2 transmit the continuously received reverse current to the ground terminal GND for discharge.

Since the ground terminal GND in the display panel 10 is generally virtual, a certain discharging time is required when current is discharged, and if relatively large reverse current is directly led to be virtual ground terminal to be discharged, it may cause incomplete discharge of the electric charges in the current, thereby causing damage to other components caused by transmission of the reverse current to other components. However, in this implementation, the power transmission line 23 is connected to the ground terminal GND via the first capacitor C1 and the second capacitor C2 that are connected in parallel, so that the reverse current transmitted from the power transmission line 23 to the driving power output end M0 charges the first capacitor C1 and the second capacitor C2 in advance for storage. Since the capacitance of the first capacitor C1 and the second capacitor C2 connected in parallel is large, the reverse current can be quickly absorbed, and thus the reverse current is quickly and greatly buffered before being transmitted to the ground terminal GND, and the reverse current finally transmitted to the ground terminal GND is reduced since the reverse current is absorbed by the first capacitor C1 and the second capacitor C2. As such, the reverse current is completely discharged through the ground terminal GND, which will not affect other electronic components.

When the third switching transistor T3 and the fourth switching transistor T4 are turned on in response to receiving the second control signal, the first capacitor C1 and the second capacitor C2, connected in parallel between the power transmission line 23 and the power supply voltage terminal VCC, are configured to output stored electric charges to the power transmission line 23 to compensate the current in the power transmission line 23.

In other implementations of the present disclosure, the number of capacitors in the energy storage circuit 223 may be adjusted according to redundant capabilities of the power-supply circuit 21 and the power-supply module 20 for the reverse current, which is not limited to two as disclosed in this implementation. In other implementations of the present disclosure, the number of capacitors in the energy storage circuit 223 may also be 1, 3, 4, or the like, which is not limited to this example. In addition, the energy storage circuit 223 may also be provided with other energy storage electronic components, for example, a capacitor and an inductor, or a resistor and a switch element to corporately form an energy storage circuit.

The voltage regulator circuit 224 includes a second resistor R2 and a third resistor R3, the second resistor R2 is connected between the ground terminal GND and the control terminals of the first switching transistor T1 and the second switching transistor T2, and is configured to maintain a level of the control terminal of the first switching transistor T1 and a level of the control terminal of the second switching transistor T2 each at a low level when the comparator CM does not output any first control signal, so as to control the first switching transistor T1 and the second switching transistor T2 to remain in an off state.

The third resistor R3 is connected between the power supply voltage VCC and control terminals of the third switching transistor T3 and the fourth switching transistor T4, and is configured to maintain a level of the control terminal of the third switching transistor T3 and a level of the control terminal of the fourth switching transistor T4 each at a high level when the comparator does not output any second control signal, so as to control the third switching transistor T3 and the fourth switching transistor T4 to remain in an off state.

Figure 9:
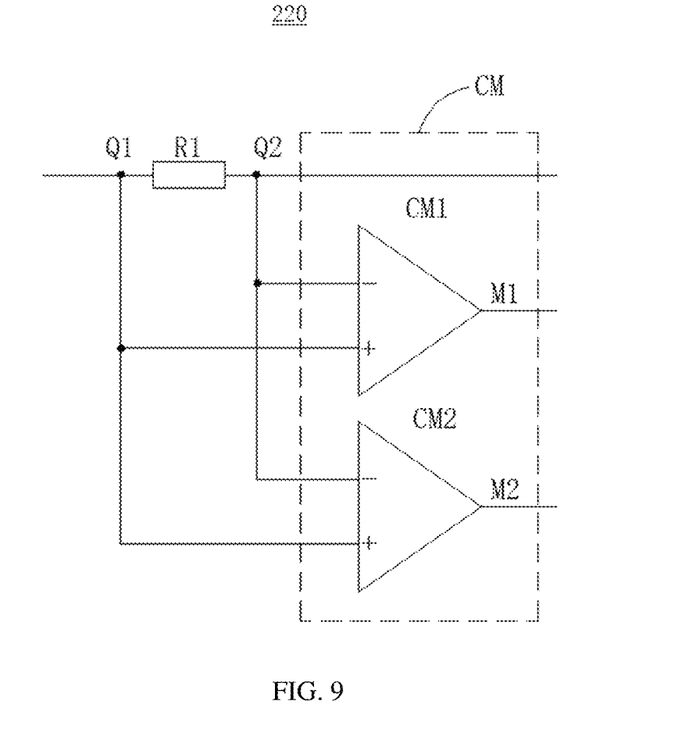
FIG. 9 is a circuit structure diagram of a comparator in FIG. 8.

Please refer to FIG. 9, which is a circuit structure diagram of a comparator in FIG. 8.

As illustrated in FIG. 9, the comparator CM includes a first operation comparator CM1 and a second operation comparator CM2, a non-inverting terminal of the first operation comparator CM1 and a non-inverting terminal of the second operation comparator CM2 are connected to the first node Q1, and an inverting terminal of the first operation comparator CM1 and an inverting terminal of the second operation comparator CM2 are connected to the second node Q2. When the voltage at the first node Q1 is detected to be greater than the voltage at the second node Q2, the first operation comparator CM1 is configured to output the first control signal to the first adjusting circuit 221 via an output end, i. e., the first comparison output terminal M1. When the voltage at the first node Q1 is detected to be less than the voltage at the second node Q2, the second operation comparator CM2 is configured to output the second control signal to the second adjusting circuit 222 via an output end, i. e., the second comparison output terminal M2.

The first switching transistor T1 to the fourth switching transistor T4 are N-type metal-oxide-semiconductor (MOS) transistors, and the first control signal and the second control signal are each at a high level, the first control signal is used to control the first switching transistors T1 and T2 and the second control signal is used to control the fourth switching transistors T3 and T4 to be turned on.

Figure 10:
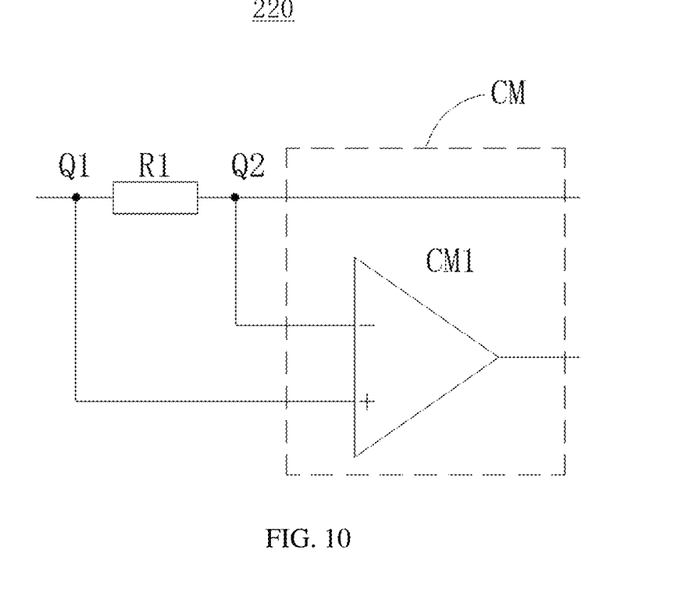
FIG. 10 is circuit structure diagram of the comparator in FIG. 8 according to another implementation.

Please refer to FIG. 10, which is circuit structure diagram of the comparator in FIG. 8 according to another implementation.

As illustrated in FIG. 10, the comparator CM includes a first operation comparator CM1. A non-inverting terminal of the first operation comparator CM1 is connected to the first node Q1, and an inverting terminal of the first operation comparator CM1 is connected to the second node Q2. When the voltage at the first node Q1 is detected to be greater than the voltage at the second node Q2, the first operation comparator CM1 is configured to output a first control signal via an output terminal. When the voltage at the first node Q1 is detected to be less than the voltage at the second node Q2, the first operation comparator CM1 is configured to output the second control signal via the output terminal. The first control signal is at a high level, and the second control signal is at a low level. Correspondingly, the first switching transistor T1 and the second switching transistor T2 are N-type MOS transistors and are configured to be turned on in response to receiving a high level from the output end of the first operation comparator CM1. The third switching transistor T3 and the fourth switching transistor T4 are P-type MOS transistors and are configured to be turned on in response to receiving a low level from the output end of the first operation comparator CM1.

In an exemplary implementation, the first to fourth switching transistors T1 to T4 and the comparator CM may also be configured according to specific requirements, which is not limited in the present disclosure.

By detecting and identifying the current in the power transmission line, the current in the power transmission line reversed to the power-supply circuit can be effectively detected, and the energy storage circuit can receive and store the current reversed to the power-supply circuit, thereby effectively preventing the damage to the power-supply circuit caused by the reverse current. Additionally, the energy storage circuit can be controlled to discharge stored electric charges to the power transmission line when the power-supply circuit outputs the driving power, to compensate the driving power output by the power-supply circuit, so as to reduce an output pressure of the power-supply circuit.

It is to be understood that the disclosure is not to be limited to the disclosed implementations. Those of ordinary skill in the art can make improvements or changes based on the above description, and all these improvements and changes should fall within the protection scope of the appended claims of this disclosure.

What is claimed is:

1. A power-supply adjusting circuit applicable to a display panel for image display, wherein the power-supply adjusting circuit is connected to a driving power output terminal of a power-supply circuit, the power-supply circuit is configured to output driving power to a plurality of data driving circuits of the display panel via the driving power output terminal; and the power-supply adjusting circuit is configured to receive reverse current and absorb-and-store the reverse current or the power-supply adjusting circuit is configured to receive the reverse current and discharge the reverse current to a ground terminal, when the power-supply adjusting circuit detects that the reverse current is input via the driving power output terminal;

wherein the power-supply adjusting circuit comprises a detecting circuit, a first adjusting circuit, an energy storage circuit, and a second adjusting circuit;

wherein the detecting circuit is connected to the driving power output terminal, the first adjusting circuit is connected to the detecting circuit and the energy storage circuit, and the second adjusting circuit is connected to the energy storage circuit;

wherein the driving power output terminal is electrically connected to the plurality of data driving circuits via a power transmission line, the detecting circuit comprises a first resistor, a first node, and a second node, the first node and the second node are two nodes at different positions in the power transmission line, the first resistor is connected in the power transmission line via the first node and a second node, the first node is disposed at one end of the first resistor away from the power-supply circuit, and the second node is located at one end of the first resistor close to the power-supply circuit; and     wherein the detecting circuit further comprises a comparator, the comparator has comparison input ends connected to the first node and the second node respectively, the comparator is configured to detect and compare a voltage at the first node and a voltage at the second node; and the comparator is configured to output the first control signal from a first comparison output terminal to the first adjusting circuit in response to detecting that the voltage at the first node is greater than the voltage at the second node, and the comparator is configured to output the second control signal from a second comparison output terminal to the second adjusting circuit in response to detecting that the voltage at the second node is greater than the voltage at the first node.

2. The power-supply adjusting circuit according to claim 1, wherein when the power-supply adjusting circuit detects that current output via the driving power output terminal serves as the driving power, the power-supply adjusting circuit is configured to output a compensation current for compensating the driving power output by the power-supply circuit to the plurality of data driving circuits.

3. The power-supply adjusting circuit according to claim 1, wherein the detecting circuit is configured to detect the reverse current input via the driving power output terminal; and wherein when the detecting circuit detects the reverse current, the detecting circuit is configured to output a first control signal to the first adjusting circuit, and the first adjusting circuit is configured to receive the reverse current according to the first control signal and transmit the reverse current to the energy storage circuit for storage or discharge.

4. The power-supply adjusting circuit according to claim 3, wherein when the detecting circuit detects current is output via the driving power output terminal, the detecting circuit is configured to output a second control signal to the second adjusting circuit, and the second adjusting circuit is configured to control, according to the second control signal, the energy storage circuit to output the compensation current to compensate the driving power output by the power-supply circuit.

5. The power-supply adjusting circuit according to claim 1, wherein the first adjusting circuit comprises a first switching transistor and a second switching transistor, the first switching transistor has a control terminal connected to the first comparison output terminal of the comparator, and is configured to receive the first control signal from the comparator and to be turned on under control of the first control signal, and the first switching transistor has a first conductive terminal connected to the power transmission line and a second conductive terminal connected to the energy storage circuit; and wherein     the second switching transistor has a control terminal connected to the first comparison output terminal of the comparator, and is configured to receive the first control signal from the comparator and to be turned on under control of the first control signal, the second switching transistor has a first conductive terminal connected to the energy storage circuit and a second conductive terminal connected to the ground terminal, and the energy storage circuit is configured to receive and store electric charges in the signal transmission line when the first switching transistor and the second switching transistor are turned on.

6. The power-supply adjusting circuit according to claim 5, wherein the second adjusting circuit comprises a third switching transistor and a fourth switching transistor, the third switching transistor has a control terminal connected to the second comparison output terminal of the comparator, and is configured to receive the second control signal from the comparator and to be turned on under control of the second control signal, the third switching transistor has a first conductive terminal connected to the energy storage circuit and a second conductive terminal connected to the power transmission line; and     the fourth switching transistor has a control terminal connected to the second comparison output terminal of the comparator, and is configured to receive the second control signal from the comparator and to be turned on under control of the second control signal, the fourth switching transistor has a first conductive terminal connected to a power supply voltage terminal and a second conductive terminal connected to the energy storage circuit, and the energy storage circuit is configured to output the compensation current to the power transmission line when the third switching transistor and the fourth switching transistor are tuned on.

7. The power-supply adjusting circuit according to claim 6, wherein the energy storage circuit comprises a first capacitor, a second capacitor, a third node, and a fourth node, the first capacitor and the second capacitor are connected in parallel between the third node and the fourth node, the second conductive terminal of the first switching transistor and the first conductive terminal of the third switching transistor are connected to the third node, and the first conductive terminal of the second switching transistor and the second conductive terminal of the fourth switching transistor are connected to the fourth node.

8. The power-supply adjusting circuit according to claim 7, wherein the power-supply adjusting circuit further comprises a voltage regulator circuit, the voltage regulator circuit comprises a second resistor and a third resistor, the second resistor is connected between the ground terminal and control terminals of the first switching transistor and the second switching transistor, the second resistor is configured to maintain the first switching transistor and the second switching transistor in an off state when the comparator does not output the first control signal; and the third resistor is connected between the power supply voltage terminal and control terminals of the third switching transistor and the fourth switching transistor, and is configured to maintain the third switching transistor and the fourth switching transistor in an off state when the comparator does not output the second control signal.

9. The power-supply adjusting circuit according to claim 7, wherein the comparator includes a first operation comparator and a second operation comparator, a non-inverting terminal of the first operation comparator and a non-inverting terminal of the second operation comparator are connected to the first node, and an inverting terminal of the first operation comparator and an inverting terminal of the second operation comparator are connected to the second node; when the voltage at the first node is detected to be greater than the voltage at the second node, the first operation comparator is configured to output the first control signal to the first adjusting circuit via an output end of the first operation comparator; and when the voltage at the first node is detected to be less than the voltage at the second node, the second operation comparator is configured to output the second control signal to the second adjusting circuit via an output end of the second operation comparator.

10. The power-supply adjusting circuit according to claim 7, the comparator includes a first operation comparator, a non-inverting terminal of the first operation comparator is connected to the first node, and an inverting terminal of the first operation comparator is connected to the second node; when the voltage at the first node is detected to be greater than the voltage at the second node, the first operation comparator is configured to output the first control signal via an output terminal; and when the voltage at the first node is detected to be less than the voltage at the second node, the first operation comparator is configured to output the second control signal via an output terminal of the first operation comparator.

11. A display terminal, comprising a display panel, a power-supply circuit, and a power-supply adjusting circuit, wherein the power-supply circuit and the power-supply adjusting circuit are configured to provide driving power for image display of the display panel; wherein the display panel comprises a control board and a driver board, wherein the control board is configured to temporarily store and decode an image data to be displayed into a driving signal, the driver board is connected to the control board and a plurality of data driving circuits, and the driver board is configured to receive the driving signal from the control board and transmit the driving signal to the plurality of data driving circuits and drive, by the plurality of data driving circuits, pixel units in a display region to display an image;

the power-supply circuit and the power-supply adjusting circuit are disposed in the control board; or the power-supply circuit is disposed in the control board, and the power-supply adjusting circuit is disposed in the driver board; and the power-supply adjusting circuit is connected to a driving power output terminal of the power-supply circuit, the power-supply circuit is configured to output driving power to a plurality of data driving circuits of the display panel via the driving power output terminal; and the power-supply adjusting circuit is configured to receive reverse current and absorb-and-store the reverse current or the power-supply adjusting circuit is configured to receive the reverse current and discharge the reverse current to a ground terminal, when the power-supply adjusting circuit detects that the reverse current is input via the driving power output terminal;

wherein the power-supply adjusting circuit comprises a detecting circuit, a first adjusting circuit, an energy storage circuit, and a second adjusting circuit;

wherein the detecting circuit is connected to the driving power output terminal, the first adjusting circuit is connected to the detecting circuit and the energy storage circuit, and the second adjusting circuit is connected to the energy storage circuit;

wherein the driving power output terminal is electrically connected to the plurality of data driving circuits via a power transmission line, the detecting circuit comprises a first resistor, a first node, and a second node, the first node and the second node are two nodes at different positions in the power transmission line, the first resistor is connected in the power transmission line via the first node and a second node, the first node is disposed at one end of the first resistor away from the power-supply circuit, and the second node is located at one end of the first resistor close to the power-supply circuit; and wherein the detecting circuit further comprises a comparator, the comparator has comparison input ends connected to the first node and the second node respectively, the comparator is configured to detect and compare a voltage at the first node and a voltage at the second node; and the comparator is configured to output the first control signal from a first comparison output terminal to the first adjusting circuit in response to detecting that the voltage at the first node is greater than the voltage at the second node, and the comparator is configured to output the second control signal from a second comparison output terminal to the second adjusting circuit in response to detecting that the voltage at the second node is greater than the voltage at the first node.

12. The display terminal according to claim 11, wherein when the power-supply adjusting circuit detects that current output via the driving power output terminal serves as the driving power, the power-supply adjusting circuit is configured to output a compensation current for compensating the driving power output by the power-supply circuit to the plurality of data driving circuits.

13. The display terminal according to claim 11, wherein the detecting circuit is configured to detect the reverse current input via the driving power output terminal; and wherein when the detecting circuit detects the reverse current, the detecting circuit is configured to output a first control signal to the first adjusting circuit, and the first adjusting circuit is configured to receive the reverse current according to the first control signal and transmit the reverse current to the energy storage circuit for storage or discharge.

14. The display terminal according to claim 13, wherein when the detecting circuit detects current is output via the driving power output terminal, the detecting circuit is configured to output a second control signal to the second adjusting circuit, and the second adjusting circuit is configured to control, according to the second control signal, the energy storage circuit to output the compensation current to compensate the driving power output by the power-supply circuit.

15. The display terminal according to claim 11, wherein the first adjusting circuit comprises a first switching transistor and a second switching transistor, the first switching transistor has a control terminal connected to the first comparison output terminal of the comparator, and is configured to receive the first control signal from the comparator and to be turned on under control of the first control signal, and the first switching transistor has a first conductive terminal connected to the power transmission line and a second conductive terminal connected to the energy storage circuit; and wherein the second switching transistor has a control terminal connected to the first comparison output terminal of the comparator, and is configured to receive the first control signal from the comparator and to be turned on under control of the first control signal, the second switching transistor has a first conductive terminal connected to the energy storage circuit and a second conductive terminal connected to the ground terminal, and the energy storage circuit is configured to receive and store electric charges in the signal transmission line when the first switching transistor and the second switching transistor are turned on.

16. The display terminal according to claim 15, wherein the second adjusting circuit comprises a third switching transistor and a fourth switching transistor, the third switching transistor has a control terminal connected to the second comparison output terminal of the comparator, and is configured to receive the second control signal from the comparator and to be turned on under control of the second control signal, the third switching transistor has a first conductive terminal connected to the energy storage circuit and a second conductive terminal connected to the power transmission line; and the fourth switching transistor has a control terminal connected to the second comparison output terminal of the comparator, and is configured to receive the second control signal from the comparator and to be turned on under control of the second control signal, the fourth switching transistor has a first conductive terminal connected to a power supply voltage terminal and a second conductive terminal connected to the energy storage circuit, and the energy storage circuit is configured to output the compensation current to the power transmission line when the third switching transistor and the fourth switching transistor are tuned on.

17. The display terminal according to claim 16, wherein the energy storage circuit comprises a first capacitor, a second capacitor, a third node, and a fourth node, the first capacitor and the second capacitor are connected in parallel between the third node and the fourth node, the second conductive terminal of the first switching transistor and the first conductive terminal of the third switching transistor are connected to the third node, and the first conductive terminal of the second switching transistor and the second conductive terminal of the fourth switching transistor are connected to the fourth node.

18. The display terminal according to claim 17, wherein the power-supply adjusting circuit further comprises a voltage regulator circuit, the voltage regulator circuit comprises a second resistor and a third resistor, the second resistor is connected between the ground terminal and control terminals of the first switching transistor and the second switching transistor, the second resistor is configured to maintain the first switching transistor and the second switching transistor in an off state when the comparator does not output the first control signal; and the third resistor is connected between the power supply voltage terminal and control terminals of the third switching transistor and the fourth switching transistor, and is configured to maintain the third switching transistor and the fourth switching transistor in an off state when the comparator does not output the second control signal.

* * * * *